(12) United States Patent  (10) Patent No.: US 8,800,587 B2
Breuer et al.  (45) Date of Patent: Aug. 12, 2014

(54) THERMAL PRESSURE RELIEF DEVICE

(75) Inventors: Patrick Breuer, Montabaur (DE); Stefan Nettesheim, Frankfurt/M (DE)

(73) Assignee: GM Global Technology Operations LLC, Detroit, MI (US)

( * ) Notice: Subject to any disclaimer, the term of this patent is extended or adjusted under 35 U.S.C. 154(b) by 238 days.

(21) Appl. No.: 13/204,122

(22) Filed: Aug. 5, 2011

(65) Prior Publication Data
US 2013/0032221 A1 Feb. 7, 2013

(51) Int. Cl.
*F16K 17/40* (2006.01)
(52) U.S. Cl.
USPC .............................. 137/74; 137/72
(58) Field of Classification Search
USPC .................... 137/468, 74, 72, 73; 251/66, 67; 236/92 C, 93 R, 93 A
See application file for complete search history.

(56) References Cited

U.S. PATENT DOCUMENTS

| | | | | |
|---|---|---|---|---|
| 1,520,126 | A * | 12/1924 | Harrold | 137/72 |
| 1,744,977 | A * | 1/1930 | Lovekin | 137/72 |
| 3,335,951 | A * | 8/1967 | Roush et al. | 236/87 |
| 3,688,982 | A * | 9/1972 | McAninch et al. | 236/93 R |
| 3,735,773 | A * | 5/1973 | Rolfsen | 137/74 |
| 4,352,365 | A * | 10/1982 | Boccardo et al. | 137/68.23 |
| 4,744,382 | A * | 5/1988 | Visnic et al. | 137/68.23 |
| 4,903,720 | A * | 2/1990 | McGill | 137/38 |
| 5,035,261 | A * | 7/1991 | Koiwa | 137/516.11 |
| 5,641,119 | A * | 6/1997 | Simonette | 236/92 C |
| 5,743,285 | A * | 4/1998 | Shalkevich | 137/74 |
| 5,967,410 | A * | 10/1999 | Lammers | 236/93 R |
| 6,286,536 | B1 * | 9/2001 | Kamp et al. | 137/68.13 |
| 6,866,057 | B1 * | 3/2005 | Buehrle, II | 137/74 |
| 7,150,287 | B2 * | 12/2006 | Kita et al. | 137/72 |
| 2009/0038687 | A1 * | 2/2009 | Kremer et al. | 137/74 |

FOREIGN PATENT DOCUMENTS

| | | |
|---|---|---|
| CN | 100342166 C | 10/2007 |
| DE | 29809230 U1 | 9/1999 |
| DE | 102006009537 B3 | 5/2007 |
| DE | 102009019833 A1 | 12/2009 |
| DE | 102009000800 A1 | 8/2010 |
| EP | 1748237 A1 | 1/2007 |
| EP | 1918621 A1 | 5/2008 |
| FR | 2951799 A1 | 4/2011 |

* cited by examiner

*Primary Examiner* — John Rivell
*Assistant Examiner* — Umashankar Venkatesan
(74) *Attorney, Agent, or Firm* — Fraser Clemens Martin & Miller LLC; J. Douglas Miller

(57) ABSTRACT

A thermal pressure relief device (TPRD) including a housing having a movable member and a retainer disposed therein. The movable member is movable between an open position and a closed position. A trigger mechanism is disposed between the movable member and the retainer. The trigger mechanism holds the movable member in the closed position and includes a substantially spherical shaped body and a temperature sensitive material disposed in the body. The temperature sensitive material volumetrically expands with an increase in temperature until a predetermined temperature is attained and a breakage of the body occurs. When the body of the trigger mechanism breaks, the movable member is displaced from the closed position to the open position, allowing a fluid to flow through the TPRD.

17 Claims, 1 Drawing Sheet

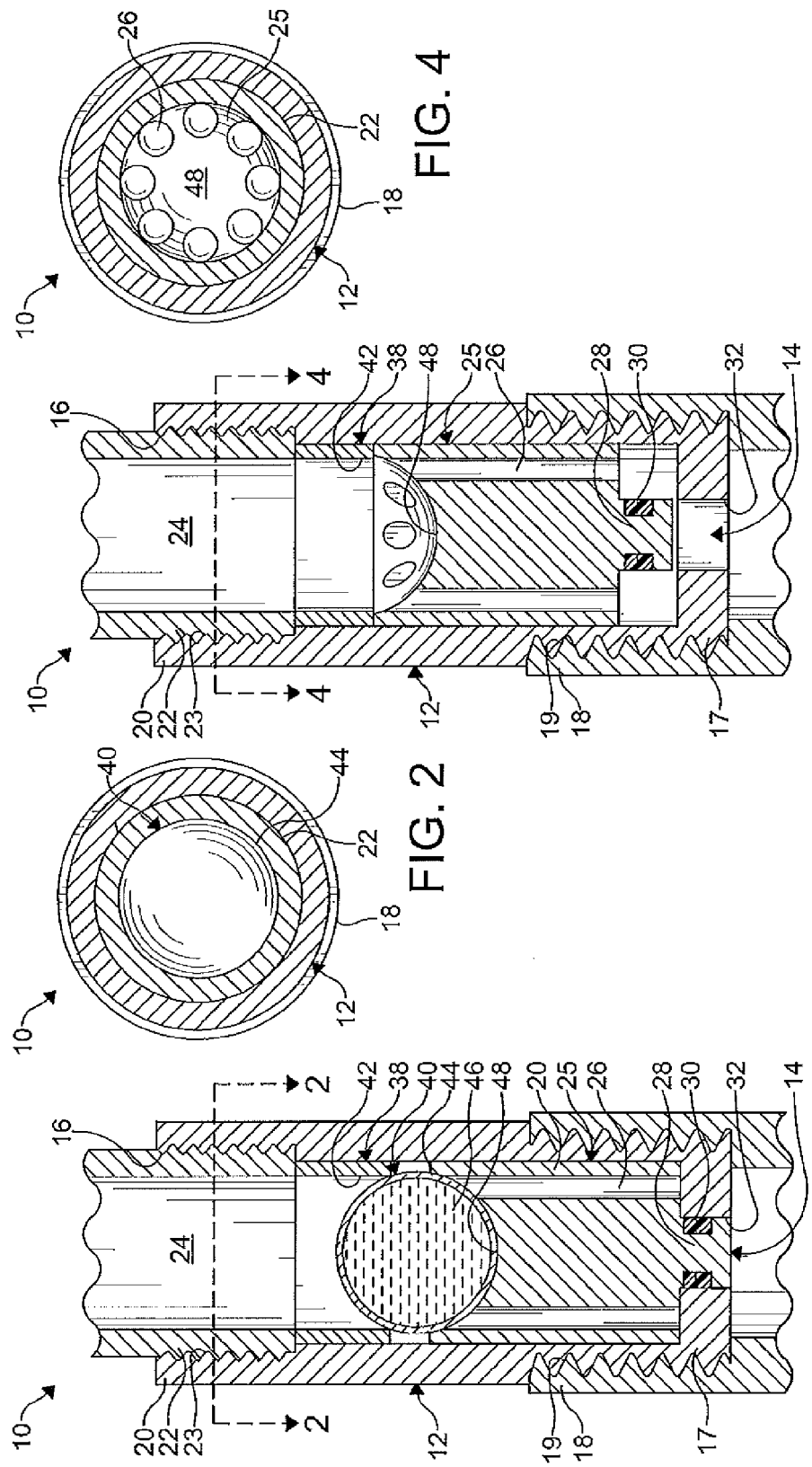

THERMAL PRESSURE RELIEF DEVICE

FIELD OF THE INVENTION

The disclosure relates to a pressure relief device and, more particularly, to a pressure relief device including a thermally responsive trigger mechanism.

BACKGROUND OF THE INVENTION

The fuel cell has been proposed as a clean, efficient, and environmentally responsible power source for various applications. A plurality of fuel cells may be arranged to form a fuel cell stack capable of powering an electric vehicle. One example of the fuel cell is a Proton Exchange Membrane (PEM) fuel cell. In the PEM fuel cell, hydrogen is supplied as a fuel to an anode and oxygen is supplied as an oxidant to a cathode. A common technique for storing hydrogen is in a lightweight, high pressure vessel resistant to puncture. High pressure vessels containing the compressed hydrogen gas must have a desired mechanical stability and integrity that militates against a rupture or bursting of the pressure vessel from the internal pressure. It is also typically desirable to make the pressure vessels on vehicles lightweight so as not to significantly affect the weight requirements of the vehicle.

Known high pressure vessels include at least one thermally activated safety valve or pressure relief device (PRD). The PRD is located at a boss or an end of the high pressure vessel that houses various valves, pressure regulators, piping connectors, excess flow limiters, etc. for allowing the pressure vessel to be filled with the compressed hydrogen gas. The PRD may also be located at another opening in the pressure vessel, though the PRD generally is disposed at one or both ends of the pressure vessel. The PRD is useful when the pressure vessel is exposed to high temperatures. More than one PRD may be used where high temperatures might occur at a localized area apart from the location of the single PRD. One known PRD includes an elongated, fragile bulb coupled to an ignitable cord which transfers heat to the PRD from remote areas of the vessel. When heated to a predetermined temperature, the bulb breaks, thereby opening the venting aperture and actuating the PRD. However, heat transfer to the PRD by the ignitable cord is not suitable in certain applications and occasionally unpredictable, which could result in an undesired rupture or bursting of the pressure vessel. Further, the elongated bulb requires a large package size, as well as includes a significant volume of temperature sensitive material to be heated for actuation of the PRD.

Accordingly, there is a continuing need for a PRD which can be installed in a high pressure vessel for use with a fuel cell stack. Desirably, the PRD includes a trigger mechanism which minimizes a package size, a manufacturing cost, and an activation period of the PRD.

SUMMARY OF THE INVENTION

In concordance and agreement with the present invention, a pressure relief device (PRD) including a trigger mechanism which minimizes a package size, a manufacturing cost, and an activation period of the PRD, has been surprisingly discovered.

In one embodiment, a thermal pressure relief device (TPRD) comprises: a hollow housing having a first end and a second end allowing a fluid to flow through the housing; a movable member disposed in the housing and movable between an open position and a closed position, at least a portion of the movable member sealing the first end of the housing when the movable member is in the closed position; a retainer fixedly disposed in the housing; and a trigger mechanism disposed between the movable member and the retainer, the trigger mechanism including a body having a temperature sensitive material disposed therein, wherein the temperature sensitive material expands volumetrically with an increase in temperature, and wherein the trigger mechanism permits a movement of the movable member from the closed position to the open position when a predetermined temperature of the temperature sensitive material is attained.

In another embodiment, a thermal pressure relief device (TPRD) comprises: a hollow housing having a first end and a second end allowing a fluid to flow through the housing; a movable member disposed in the housing and movable between an open position and a closed position, the movable member including a closure portion and an array of bores formed therein allowing the fluid to flow therethrough, the closure portion configured to cooperate with a sealing member to form a substantially fluid tight seal between the movable member and the housing sealing the first end of the housing when the movable member is in the closed position; a retainer fixedly disposed in the housing, the retainer having a central bore formed therein allowing the fluid to flow therethrough; and a trigger mechanism disposed between the movable member and the retainer, the trigger mechanism including a substantially spherical shaped body having a temperature sensitive material disposed therein, wherein the temperature sensitive material expands volumetrically with an increase in temperature, and wherein the trigger mechanism permits a movement of the movable member from the closed position to the open position when a predetermined temperature of the temperature sensitive material is attained.

In another embodiment, a thermal pressure relief device (TPRD) for a high pressure vessel comprises: a thermally conductive hollow housing including a first end having a first aperture formed therein and a second end having a second aperture formed therein, the apertures allowing a fluid to flow through the housing, wherein the first end of the housing is coupled to a valve of a high pressure vessel and the second end of the housing is coupled to a vent pipe; a movable member disposed in the housing and movable between an open position and a closed position, the movable member including a substantially T-shaped closure portion and an array of bores formed therein allowing the fluid to flow therethrough, the closure portion configured to cooperate with a sealing member to form a substantially fluid tight seal between the movable member and the housing sealing the first aperture when the movable member is in the closed position; a retainer fixedly disposed in the housing, the retainer having a central bore formed therein allowing the fluid to flow therethrough; and a trigger mechanism disposed between the movable member and the retainer, the trigger mechanism including a substantially spherical shaped glass body having a temperature sensitive material disposed therein, wherein at least a portion of the body is seated in an indentation formed in the movable member and at least another portion of the body is seated in the central bore of the retainer, and wherein the temperature sensitive material expands volumetrically with an increase in temperature until a predetermined temperature is attained and a breakage of the body occurs to permit a movement of the movable member from the closed position to the open position.

BRIEF DESCRIPTION OF THE DRAWINGS

The above, as well as other advantages of the present disclosure, will become readily apparent to those skilled in the art from the following detailed description, particularly when considered in the light of the drawings described hereafter.

FIG. 1 is a fragmentary side cross-sectional elevational view of a thermal pressure relief device (TPRD) according to an embodiment of the present invention, showing a trigger mechanism in its entirety and a main piston in a closed position;

FIG. 2 is a cross-sectional view of the TPRD illustrated in FIG. 1 taken along section line 2-2;

FIG. 3 is a fragmentary side cross-sectional elevational view of the TPRD, showing the trigger mechanism actuated and the main piston in an open position; and FIG. 4 is a cross-sectional view of the TPRD illustrated in FIG. 3 taken along section line 4-4.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

FIGS. 1-4 show a thermal pressure relief device (TPRD) 10 according to an embodiment of the present invention. The TPRD 10 shown includes a cylindrical housing 12. It is understood that the housing 12 can have any shape and size as desired. It is further understood that the housing 12 is formed from any suitable material such as a thermally conductive material, for example. The housing 12 includes a first aperture 14 and a second aperture 16. The first and second apertures 14, 16 are configured to allow a fluid (not shown) to flow through the housing 12. For example, the fluid may flow from a high pressure vessel (not shown) through the TPRD 10 to the atmosphere when the TPRD 10 is actuated. As shown in FIGS. 1 and 3, a first end 17 of the housing 12 is coupled with an on-tank valve (OTV) 18 by a threaded connection 19. The OTV 18 may be mounted to the high pressure vessel and include additional components such as an automatic shut-off valve, a manual valve, a temperature sensor, and a pressure sensor. Other suitable means for placing the TRPD 10 in fluid communication with the high pressure vessel may also be employed. A second end 20 of the housing 12 is coupled with a vent pipe 22 by a threaded connection 23. A passageway 24 formed through the vent pipe 22 is configured to allow the fluid to flow to the atmosphere from the TPRD 10. As illustrated, the OTV 18, the TPRD 10, and the vent pipe 22 are arranged in a linear configuration, although other configurations can be used.

The TPRD 10 has a movable member 25 axially displaceably disposed in the housing 12. It is understood that the movable member 25 can be formed from any suitable material such as aluminum or stainless steel, for example. The movable member 25 is movable between a closed position as shown in FIG. 1 and an open position as shown in FIG. 3. In a non-limiting example, the movable member 25 includes an annular array of bores 26 formed therein for facilitating the flow of the fluid therethrough when the movable member 25 is in the open position. Multiple bores 26 militate against a blockage of the flow of the fluid through the housing 12 if one of the bores 26 were to become blocked with particles being expelled along with the fluid being discharged. It is understood that each of the bores 26 can have any diameter as desired to allow a desired mass flow rate of the fluid through the housing 12.

When in the closed position, a closure portion 28 of the movable member 25 seals the first aperture 14. Although the closure portion 28 shown has a substantially T-shaped cross-section, it is understood that the closure portion 28 can have any shape as desired. The movable member 25 may include at least one sealing member 30 disposed thereon. The sealing member 30 forms a substantially fluid tight seal between the movable member 25 and an inner surface 32 of the housing 12 when the movable member 25 is in the closed position. As a nonlimiting example, the sealing member 30 is an O-ring. The sealing member 30 may also be disposed on the inner surface 32 of the housing 12 forming the first aperture 14, for example. Additional or fewer sealing members 30 than shown may be employed as desired.

A retainer 38 and a trigger mechanism 40 are also disposed in the housing 12. A position within the housing 12 of the retainer 38 shown is maintained by abuttable engagement with the vent pipe 22. However, it is understood that the position of the retainer 38 within the housing 12 can be maintained by other means as desired such as a threaded connection between the retainer 38 and the housing 12, for example. The retainer 38 includes a central bore 42 formed therein for facilitating the flow of the fluid therethrough when the movable member 25 is in the open position. A diameter of the bore 42 is smaller than a diameter of the trigger mechanism 40, yet sized to permit at least a portion of the trigger mechanism 40 to be disposed within the retainer 38 for retention thereof.

As shown, the trigger mechanism 40 is a substantially spherical shaped glass body 44 having a temperature sensitive material 46 disposed therein. It is understood that the body 44 can be produced from any suitable material as desired. The body 44 is substantially spherical shaped to minimize a package size of the TPRD 10, as well as minimize an activation period of the TPRD 10. In a non-limiting example, the substantially spherical shape of the body 44 minimizes the package size of the TPRD 10 by approximately 50% compared to commonly known TRPDs using other body shapes for the trigger mechanism. The activation period is typically the period of time from when the TPRD 10 is exposed to excessive heat to when the TPRD 10 actuates. Because of the spherical shape of the body 44, a volume of the temperature sensitive material 46 required to be heated for actuation of the TPRD 10 is minimized. Thus, the temperature of the temperature sensitive material 46 rapidly increases when exposed to the heat, thereby minimizing the activation period of the TPRD 10. As illustrated in FIGS. 1 and 3, at least a portion of the trigger mechanism 40 is disposed in an indentation 48 formed in the movable member 25 to maintain a position of the trigger mechanism 40, as well as further minimize the package size of the TPRD 10.

A diameter and a wall thickness of the body 44 are configured such that the body 44 is capable of withstanding a compression force from the movable member 25 caused by a pressure of the fluid against the movable member 25. However, the wall thickness of the body 44 is also configured such that the body 44 breaks when a predetermined temperature of the temperature sensitive material 46 is attained. The temperature sensitive material 46 expands volumetrically with an increase in temperature. The temperature sensitive material 46 can expand linearly or non-linearly, as desired. As a non-limiting example, the temperature sensitive material 46 may one of expand linearly with temperature and expand primarily within a defined temperature range. The temperature sensitive material 46 may be a glycerin, for example. Other suitable temperature sensitive materials 46 may also be selected.

When the TRPD 10 is exposed to excessive heat, the thermally conductive housing 12 transfers the heat to the trigger mechanism 40 disposed therein. Accordingly, the temperature of the temperature sensitive material 46 within the body 44 of the trigger mechanism 40 increases, causing the temperature sensitive material 46 to expand volumetrically. The temperature sensitive material 46 expands to a point that the body 44 fractures and breaks, actuating the TPRD 10. The point at which the body 44 fractures and breaks is the same point at which the predetermined temperature of the temperature sensitive material 46 is attained. When the body 44 of the trigger mechanism 40 breaks, a pressure of the fluid in the high pressure vessel causes the movable member 25 to be axially displaced from the closed position towards the retainer 38 until the movable member 25 is in the open position. As the movable member 25 is axially displaced, the closure portion 28 of the movable member is caused to move out of and away from the first aperture 14. Once the substantially fluid tight seal between the movable member 25 and the housing 12 is disrupted, the fluid is permitted to flow through the housing 12 and the bores 26, 42, releasing the fluid into the atmosphere or, as shown, into the vent pipe 22 to a position remote from the excessive heat.

While certain representative embodiments and details have been shown for purposes of illustrating the invention, it will be apparent to those skilled in the art that various changes may be made without departing from the scope of the disclosure, which is further described in the following appended claims.

The invention claimed is:

1. A thermal pressure relief device (TPRD), comprising:
   a hollow housing having a first end and a second end allowing a fluid to flow through the housing;
   a movable member disposed in the housing and movable between an open position and a closed position, at least a portion of the movable member sealing the first end of the housing when the movable member is in the closed position;
   a retainer fixedly disposed in the housing; and
   a trigger mechanism disposed between the movable member and the retainer, the trigger mechanism including a non-pyriform shaped body having a temperature sensitive material disposed therein, wherein the temperature sensitive material expands volumetrically with an increase in temperature, and wherein the trigger mechanism permits a movement of the movable member from the closed position to the open position when a predetermined temperature of the temperature sensitive material is attained, wherein the housing is formed from a thermally conductive material to facilitate a transfer of heat to the temperature sensitive material of the trigger mechanism, wherein the movable member includes a plurality of longitudinal bores formed therein to facilitate a fluid flow therethrough when the movable member is in the open position.

2. The TPRD according to claim 1, wherein the movable member includes an indentation formed therein configured to receive at least a portion of the trigger mechanism therein when the movable member is in the closed position.

3. The TPRD according to claim 1, wherein the movable member includes a substantially T-shaped closure portion configured to receive at least one sealing member thereon that forms a substantially fluid tight seal between the movable member and the housing.

4. The TPRD according to claim 1, wherein the body of the trigger mechanism is substantially spherical shaped.

5. The TPRD according to claim 1, wherein the body of the trigger mechanism is formed from a glass material.

6. The TPRD according to claim 1, wherein the body withstands a compression force from the movable member.

7. The TPRD according to claim 1, wherein the temperature sensitive material is a glycerin.

8. The TPRD according to claim 1, wherein the retainer includes a bore formed therein to facilitate a fluid flow therethrough when the movable member is in the open position.

9. The TPRD according to claim 1, wherein the retainer receives at least a portion of the trigger mechanism therein when the movable member is in the closed position.

10. A thermal pressure relief device (TPRD), comprising:
    a hollow housing having a first end and a second end allowing a fluid to flow through the housing;
    a movable member disposed in the housing and movable between an open position and a closed position, the movable member including a closure portion and an annular array of longitudinal bores formed therein allowing the fluid to flow therethrough, the closure portion configured to cooperate with a sealing member to form a substantially fluid tight seal between the movable member and the housing sealing the first end of the housing when the movable member is in the closed position;
    a retainer fixedly disposed in the housing, the retainer having a central bore formed therein allowing the fluid to flow therethrough; and
    a trigger mechanism disposed between the movable member and the retainer, the trigger mechanism including a non-pyriform shaped and substantially spherical shaped body having a temperature sensitive material disposed therein, wherein the temperature sensitive material expands volumetrically with an increase in temperature, and wherein the trigger mechanism permits a movement of the movable member from the closed position to the open position when a predetermined temperature of the temperature sensitive material is attained, wherein the housing is formed from a thermally conductive material to facilitate a transfer of heat to the temperature sensitive material of the trigger mechanism.

11. The TPRD according to claim 10, wherein the housing is coupled to a valve of a high pressure vessel.

12. The TPRD according to claim 10, wherein the housing is coupled to a vent pipe allowing the fluid to flow to a remote position.

13. The TPRD according to claim 10, wherein the movable member includes an indentation formed therein configured to receive at least a portion of the trigger mechanism therein.

14. The TPRD according to claim 10, wherein the body of the trigger mechanism is formed from a glass material.

15. The TPRD according to claim 10, wherein the body withstands a compression force from the movable member.

16. A thermal pressure relief device (TPRD) for a high pressure vessel, comprising:
    a thermally conductive hollow housing including a first end having a first aperture formed therein and a second end having a second aperture formed therein, the apertures allowing a fluid to flow through the housing, wherein the first end of the housing is coupled to a valve of a high pressure vessel and the second end of the housing is coupled to a vent pipe;
    a movable member disposed in the housing and movable between an open position and a closed position, the movable member including a substantially T-shaped closure portion and an annular array of longitudinal bores formed therein allowing the fluid to flow therethrough, the closure portion configured to cooperate with a sealing member to form a substantially fluid tight seal between the movable member and the housing sealing the first aperture when the movable member is in the closed position;

a retainer fixedly disposed in the housing, the retainer having a central bore formed therein allowing the fluid to flow therethrough; and a trigger mechanism disposed between the movable member and the retainer, the trigger mechanism including a non-pyriform shaped and substantially spherical shaped glass body having a temperature sensitive material disposed therein, wherein at least a portion of the body is seated in an indentation formed in the movable member and at least another portion of the body is seated in the central bore of the retainer, and wherein the temperature sensitive material expands volumetrically with an increase in temperature until a predetermined temperature is attained and a breakage of the body occurs to permits a movement of the movable member from the closed position to the open position.

17. The TPRD according to claim 16, wherein the body withstands a compression force from the movable member and is capable of breaking at the predetermined temperature of the temperature sensitive material.

* * * * *